United States Patent [19]

Twerdochlib et al.

[11] Patent Number: 4,951,500
[45] Date of Patent: Aug. 28, 1990

[54] METHOD FOR DETERMINING THE UNTWIST OF TURBINE BLADES

[75] Inventors: Michael Twerdochlib, Oviedo; Robert L. Osborne, Winter Springs; Paul F. Rozelle, Fern Park, all of Fla.

[73] Assignee: Westinghouse Electric Corp., Pittsburgh, Pa.

[21] Appl. No.: 385,753

[22] Filed: Jul. 26, 1989

[51] Int. Cl.⁵ .......................................... G01M 15/00
[52] U.S. Cl. ................................................. 73/119 R
[58] Field of Search .............. 73/119 R, 660; 415/118

[56] References Cited

U.S. PATENT DOCUMENTS

| | | | |
|---|---|---|---|
| 3,467,358 | 9/1969 | Zablotsky et al. | 73/660 |
| 4,518,917 | 5/1985 | Oates et al. | 324/207 |
| 4,573,358 | 3/1986 | Luongo | 73/660 |

FOREIGN PATENT DOCUMENTS 236827  7/1969  U.S.S.R. ................................ 73/660

Primary Examiner—Jerry W. Myracle
Attorney, Agent, or Firm—K. Bach

[57] ABSTRACT

A method of determining the untwist of turbine blades under dynamic conditions is comprised of the steps of producing a first pair of blade passing event signals in response to a blade tip's movement past a pair of fixed sensors. The signals comprising the first signal pair are compared to one another to establish a first differential value. Another data point containing blade vibrational information is produced. The first differential value and the other data point are evaluated to discriminate between blade untwist and synchronous vibration. Based on the magnitude of the blade untwist, inferences can be drawn regarding the status of the turbine blade lashing wires.

9 Claims, 3 Drawing Sheets

METHOD FOR DETERMINING THE UNTWIST OF TURBINE BLADES

BACKGROUND OF THE INVENTION

1. Field of the Invention

The present invention is directed generally to monitoring the operating parameters in a steam turbine and more particularly to the monitoring of centrifugal loading of the turbine blades.

2. Description of the Prior Art

Because of the harsh environment within a steam turbine and the enormous mechanical forces which the rotating shaft and blades of the turbine experience, it has been recognized that such rotating components should be monitored for the purposes of scheduling maintenance, detecting components on the verge of failure, and the like. A variety of apparatus and methods have been developed for monitoring various components within steam turbines. For example U.S. Pat. Application Ser. No. 202,742 now U.S. Pat. No. 4,887,468 for a Non-Synchronous Turbine Blade Vibration Monitoring System, filed June 8, 1988, and U.S. Pat. Application Ser. No. 217,591 for a Turbine Blade Vibration Detection System, filed July 11, 1988, both assigned to the assignee of the present invention, are directed to monitoring the vibration of unshrouded turbine blades. U.S. Pat. No. 3,467,358 is for a Vibrator Indicator For Turboengine Rotor Blading. The system disclosed therein employs two sensors which are displaced rotation-wise relative to each other so that vibrations having an amplitude greater than a preset amplitude can be detected.

Turbine blades, however, are subjected to forces other than synchronous and nonsynchronous vibrations. For example, aerodynamic requirements mandate that large turbine blades, whether grouped or free-standing, have a twist formed between the root 12 and tip 10 as can be seen from a radial view from the tip of the blade 10 as shown in FIG. 1. That twist accommodates the increase in tangential blade velocity that exists as a monotonically increasing function of radius. The asymmetry affixed to the blade by the twist couples the axial and torsional stress in the blade. Centrifugal loading of the blade induced by rotation in the direction of arrow 36 produces forces indicated by arrows 14 in FIG. 1 which tend to untwist the blade. For example, a large free-standing blade may be subjected to sufficient centrifugal loadings to produce a three degree untwist at the blade tip at running speeds. In a lashed blade, that untwist may be small due to the constraining effect of the lashing wires. However, some degree of untwist is still experienced by the group as a whole and in the individual blades outboard of the outermost lashing wire.

The degree of untwist experienced by a turbine blade is an important factor in the design and performance of the blade. Thus, the need exists for a device that can accurately measure untwist in an economical manner which does not require substantial modification of existing steam turbines.

SUMMARY OF THE INVENTION

The present invention is directed to a method for determining the untwist of turbine blades under dynamic conditions. The method is comprised of the steps of producing a first pair of blade passing event signals in response to a blade tip's movement past a first pair of fixed sensors. The signals comprising the first signal pair are compared to one another to establish a first differential value. Another data point containing information relevant to the vibrational condition of the turbine blades is produced. The first differential value and the other data point are evaluated to discriminate between blade untwist and synchronous vibration.

According to one embodiment of the present invention, the step of producing another data point includes the steps of producing a second pair of blade passing event signals when a blade tip passes a second pair of fixed sensors. The second pair of sensors is displaced rotation-wise from the first pair of sensors an amount which is a nonintegral multiple of the wavelength of the resonant frequencies of the blade. The signals of the second signal pair are compared to one another to establish a second differential value. The first and second differential values are then evaluated to discriminate between blade untwist and synchronous vibration.

According to another embodiment of the present invention, the step of producing another data point includes the steps of changing an operating parameter such as turbine speed, steam flow rate, or temperature, from a first value at which the first differential value was established to a second value. A second pair of blade passing event signals is produced when a blade tip passes the first pair of fixed sensors. The signals of the second signal pair are compared to one another to establish a second differential value. The first and second differential values are evaluated to discriminate between blade untwist and synchronous vibration.

According to another embodiment of the present invention, the degree of blade untwist can be used to infer the condition of the lashing wires.

The present invention provides an accurate dynamic measurement of blade untwist or blade rotation. Such measurements can be made without major modifications to existing equipment. Those and other advantages and benefits of the present invention will become apparent from the Description Of A Preferred Embodiment hereinbelow.

BRIEF DESCRIPTION OF THE DRAWINGS

For the present invention to be clearly understood and readily practiced, a preferred embodiment will now be described, by way of example only, with reference to the accompanying figures wherein.

DESCRIPTION OF A PREFERRED EMBODIMENT

Figure 2:
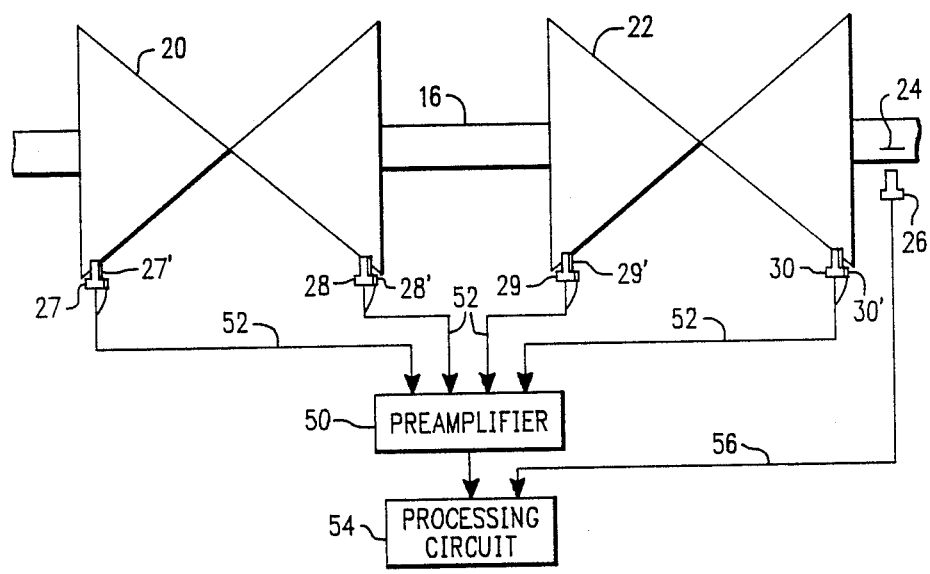
FIG. 2 illustrates a portion of a turbine generator shaft carrying two low-pressure turbines equipped with sensors and associated hardware for practicing the present invention.

FIG. 2 illustrates a portion of a turbine generator shaft 16 carrying a first low pressure turbine 20 and a second low pressure turbine 22 as is known. The shaft 16 may be provided with indicia 24 which cooperates with a sensor 26 to produce a once per revolution signal as is known.

Each of the blade rows (not shown) in the low pressure turbines 20 and 22 which are to be monitored are provided with pairs of sensors. Thus, sensors 27 and 27' and sensors 28 and 28' each monitor a blade row within low pressure turbine 20 while sensors 29 and 29' and sensors 30 and 30' each monitor a blade row within low pressure turbine 22.

Figure 1:
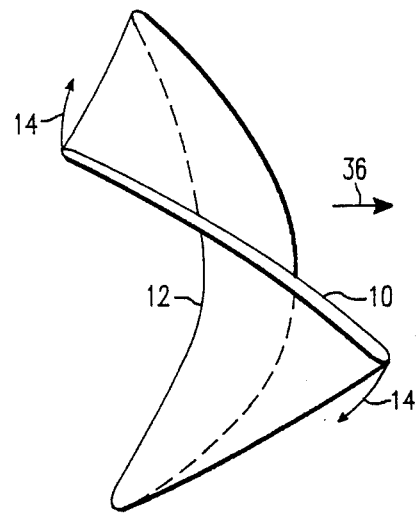
FIG. 1 is a radial view of a turbine blade from the blade tip which illustrates the twist of the blade and the direction of the moment which tends to untwist the blade.
Figure 3:
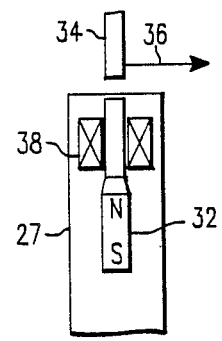
FIG. 3 is a cross-sectional view of one of the sensors illustrated in FIG. 2.

The sensors 27-30 and 27'-30' may be of a type shown in cross-section in FIG. 3. The sensor has a permanent magnet 32 which produces a magnetic field and a sensing coil 38 which produces an output voltage or output signal when the flux of the magnetic field changes. A blade travelling in the direction illustrated by arrow 36 will, upon passing the sensor 27, affect the reluctance of the magnetic flux path. That causes a change in the magnetic flux through the sensing coil 38 and produces an output signal 47, seen in FIG. 4, which is indicative of the blade passing event. Other sensors such as optical sensors, eddy current sensors, or capacitive sensors may be used to detect the blade passing events.

The signals produced by the sensor pairs are input to a preamplifier 50 through appropriate cables 52. The preamplifier inputs the amplified signals to a circuit 54 for further processing, storage, and/or display. The circuit 54 also receives, through a conductor 56, the once per revolution signal produced by the sensor 26.

Figure 4:
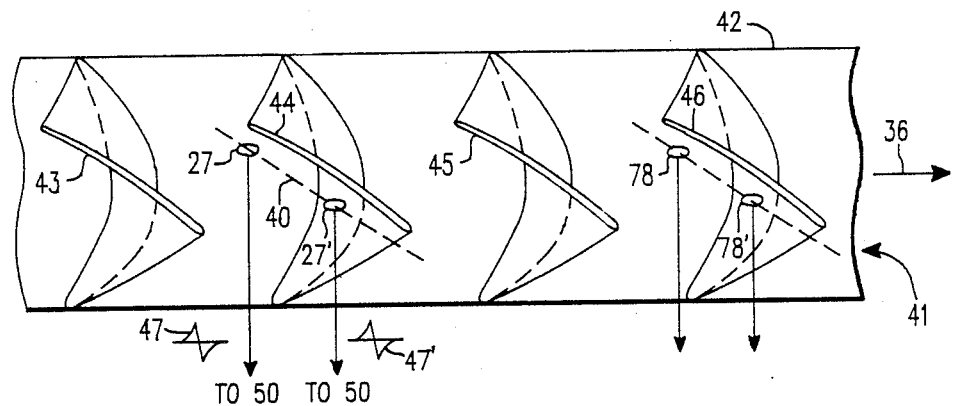
FIG. 4 illustrates the positioning of the sensors relative to the blade tip and the signals produced in response to a blade passing event.

In FIG. 4, a radial view of a portion of a rotor disc 42 carried by shaft 16 is illustrated. Rotor disc 42 is positioned, for example, within low pressure turbine 20 and carries a row 41 of turbine blades. Blades 43-46 represent a portion of the blade row 41 carried by the rotor disc 42. The shaft 16, rotor disc 42, and blade row 41 rotate in the direction illustrated by the arrow 36.

FIG. 4 also illustrates the positioning of sensors 27 and 27' relative to the blade row carried by the rotor disc 42. The sensors 27 and 27' may be positioned in mounting holes in the flow guide (not shown) approximately 0.125 inches (3 mm) above the tips of the monitored blade row 41. The reader should understand that each of the other sensor pairs is similarly positioned to monitor a blade row. Each of the sensors 27 and 27' produces a signal 47 and 47', respectively, which is indicative of a blade passing event. The signals 47 and 47' have characteristic zero crossings when the tip of one of the blades 43-46 is in the position indicated by the broken line 40. Thus, as the tip of each of the blades within the blade row passes the pair of sensors monitoring that row, a pair of blade passing event signals 47 and 47' is produced.

At a low reference speed, the sensors 27 and 27' produce a pair of blade passing event signals 47 and 47' which differ by a certain amount which is used to establish a reference. That is, the blade tip arrives at sensors 27 and 27' at substantially the same time. The signals 47 and 47' are compared to one another to establish a first differential value $(\Delta T)_i$, where i typically has a value from one to seventy-two to identify the particular blade with which the measurement is associated.

A first base line differential value may be established for on-line speed by multiplying one of the first differential values by a reference speed and dividing by on-line speed. Subsequent $(\Delta t)_i$'s are measured on-line for each blade and then subtracted from the first base line differential value, i.e. $((\Delta t)_i - (\Delta T)_i)$. Thus, either the $(\Delta t)_i$ or the $((\Delta t)_i - (\Delta T)_i)$ value may be used as the first differential value. In either case, the once per revolution signal produced by the sensor 26 permits a blade number tag to be affixed to the first differential value to identify the particular blade with which that value is associated.

One of the first differential values may be affected by synchronous vibration. Because synchronous vibration response varies greatly with changes in rotor speed while blade untwist is a more steady state condition, small variations in speed ($\pm 1\%$) will result in large variations ($\pm 100\%$) in the measured parameter. By changing the speed of the turbine and repeating the above-identified process to establish second differential values, an evaluation can be performed based on the first and second differential values to discriminate between blade untwist and synchronous vibration. Specifically, the first differential value may be compared to the second differential value. Because of the strong relationship between turbine speed and synchronous vibration, very little deviation is expected between the two values if the phenomena being measured is a steady state phenomena, i.e. blade untwist. However, if the phenomena being measured is the result of synchronous vibration, a substantial deviation between the two values is expected. Therefore, such a deviation would indicate that the phenomena being measured is synchronous vibration and not blade untwist As an alternative to changing the speed, other turbine parameters may be changed provided that one of the two phenomena being measured, synchronous vibration or blade untwist, responds more to that change than the other and the magnitude of that response is known. For example, the steam flow through the turbine may be changed because the amplitude of vibration responds more strongly to a change in steam flow than does untwist. Changing the steam flow may be more practical than changing speed because damage often occurs when the generator is synchronized to the line and running at constant speed. Because it is expensive to trip the generator off line, the use of a flow change may be preferred to using a change of speed to generate the second differential values.

Another parameter that may be changed is the reheat temperature which will result in a change in the blade temperatures. Blade vibration responds to temperature changes more strongly than does untwist.

It has been determined that other data containing blade vibrational information may be used to discriminate between synchronous vibration and blade untwist. Such other data may be generated, for example, by a second pair of fixed sensors 78, 78' (FIG. 4) positioned rotation-wise from the first pair of fixed sensors 27, 27' a distance which is a nonintegral multiple of the wavelength of the resonant frequencies of the blade. The signals produced by the second pair of sensors 78, 78' are compared to one another to produce a second differential value. Thereafter, the first and second differential values may be evaluated as discussed above to discriminate between synchronous vibration and blade untwist. Any other suitable source of such data, such as strain gauges, may also be used to provide the additional data point needed to discriminate between synchronous vibration and blade untwist.

Figure 5:
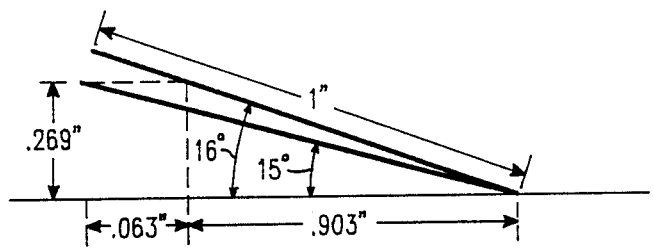
FIGS. 5 and 6 are useful in understanding how the sensitivity of the present invention is related to the twist of the blade.

Experience with magnetic sensors of the type to be used for sensors 27-30, 27'-30', and 78, 78' has indicated that blade tip position can be measured within 0.002 to 0.003 inches (0.050 mm to 0.075 mm). However, the sensitivity of blade tip measurements is considerably enhanced by the highly acute angle of the blade tips with respect to the plane of rotation typically 15°. That sensitivity can be appreciated by calculating the change in the blade intercept with two sensors mounted one inch (25.4 mm) apart, i.e. .259 inches (6.3 mm) axially, given a 1° blade tip untwist. That situation is illustrated in FIG. 5. As can be seen from FIG. 5, when the angle changes from 15° to 16°, a 0.063 inch (1.6 mm) reduction in blade intercept distance is realized.

Figure 6:
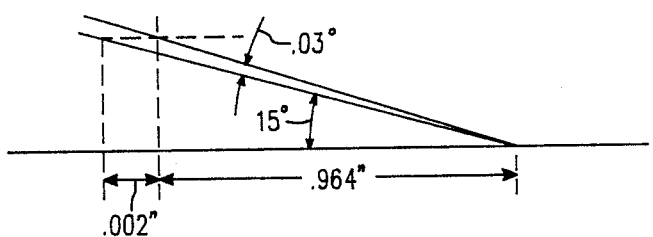

FIG. 6 illustrates that the currently known ability to resolve blade tip position within 0.002 inches (0.050 mm) results in a blade tip untwist resolution capability of 0.03°.

Large turbine blades are often lashed into groups of four, five, or more blades at one or more points along the blades' length to provide the strength necessary to ensure the integrity of all blades in the row. Under certain conditions, the lashing wires may separate or disjoin. The resultant loss of mutual blade support may result in rapid blade failure and extensive consequential damage to other blades. The method of the present invention may be used to rapidly detect a broken lashing wire so that operator action may be taken before severe consequential blade damage occurs.

Figure 7:
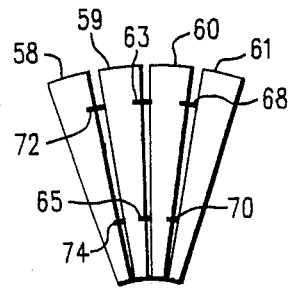
FIG. 7 illustrates the lashing wires used in a typical group of four turbine blades.

FIG. 7 illustrates a typical group of four blades 58-61 which are lashed together. The blades 59 and 60 are connected through an upper inboard lashing wire 63 and a lower inboard lashing wire 65. The blades 60 and 61 are connected through an upper outboard lashing wire 68 and a lower outboard lashing wire 70. In a similar manner, blades 58 and 59 are connected through an upper outboard lashing wire 72 and a lower outboard lashing wire 74. In the event of an outboard lashing wire 68, 70, 72, 74 failure, the outboard blade 58 or 61 which has lost the support previously provided by the broken lashing wire will experience a greater degree of untwist. Those types of lashing wire breaks produce the greatest degree of untwist which is approximately one degree. If an innermost lashing wire 63, 65 separation also occurs, approximately two additional degrees of blade rotation will be experienced.

Figure 8:
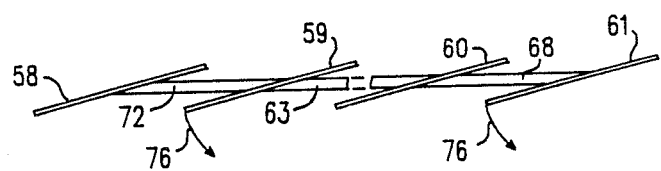
FIG. 8 illustrates a type of lashing wire failure which the present invention can be used to detect.

The failure of an inboard lashing wire 63, 65 produces a smaller collective rotation or subgroup twist represented by arrows 76 as shown in FIG. 8. The degree of blade tip rotation may be determined by computer modeling and verified by on-line testing. Because the blades 58-61 remain lashed together although in smaller groups, inboard lashing wire 63, 65 breaks are expected to be less serious and may not require action, or even detection, until both the outer and inner lashing wires fail.

The method of the present invention provides a dynamic and accurate measurement of blade rotation or untwist. That measurement can be obtained without substantially modifying existing equipment, especially where that equipment has been provided with some type of blade vibration monitor wherein magnetic sensors are positioned so as to produce signals representative of blade passing events. In addition to monitoring the degree of untwist, that degree of untwist may be used to infer the condition of lashing wires. The rapid detection of a broken lashing wire allows for operator action before severe consequential blade damage can occur.

While the present invention has been described in conjunction with a preferred embodiment thereof, modifications and variations will be apparent to those of ordinary skill in the art. This disclosure in the following claims are intended to cover all such modifications and variations.

What we claim is:

1. A method for determining the untwist of turbine blades under dynamic conditions, comprising the steps of:
   producing a first pair of blade passing event signals when a blade tip passes a first pair of fixed sensors;
   comparing said signals of said first signal pair to one another to establish a first differential value;
   producing another data point containing information relevant to the vibrational condition of the turbine blades; and
   evaluating said first differential value and said another data point to discriminate between blade untwist and synchronous vibration.

2. The method of claim 1 wherein the step of producing another data point includes the steps of:
   producing a second pair of blade passing event signals when a blade tip passes a second pair of fixed sensors displaced rotation-wise from said first pair of sensors a nonintegral multiple of the wavelength of the resonant frequencies of the blade; and
   comparing said signals of said second signal pair to one another to establish a second differential value;
   said first and second differential values being evaluated to discriminate between blade untwist and synchronous vibration.

3. The method of claim 1 wherein the step of producing another data point includes the steps of:
   changing an operating parameter of the turbine from a first value at which the first differential value was established to a second value;
   producing a second pair of blade passing event signals when a blade tip passes the first pair of fixed sensors; and
   comparing said signals of said second signal pair to one another to establish a second differential value;
   said first and second differential values being evaluated to discriminate between blade untwist and synchronous vibration.

4. The method of claim 3 wherein the parameter which is changed is turbine speed.

5. The method of claim 3 wherein the parameter which is changed is steam flow.

6. The method of claim 3 wherein the parameter which is changed is temperature.

7. The method of claim 3 wherein the step of evaluating said first and second differential values includes the steps of comparing said first differential value to said second differential value to determine the variation therebetween, said variation exceeding an expected value when said first differential value is representative of synchronous vibration and is less than said expected value when said first differential value is representative of blade untwist.

8. The method of claim 3 additionally comprising the steps of producing additional pairs of blade passing event signals at the first and second parameter values and wherein each pair is used to produce additional first and second differential values, respectively.

9. The method of step 1 additionally comprising the step of inferring the condition of the lashing wires based on the magnitude of the first differential value when said value is representative of untwist.

* * * * *